(12) United States Patent
Davey

(10) Patent No.: US 10,038,841 B1
(45) Date of Patent: *Jul. 31, 2018

(54) SYSTEM FOR STREAMING MULTIPLE REGIONS DERIVING FROM A WIDE-ANGLE CAMERA

(75) Inventor: Mark Kenneth Davey, Bromley (GB)

(73) Assignee: Grandeye Ltd., London (GB)

( * ) Notice: Subject to any disclaimer, the term of this patent is extended or adjusted under 35 U.S.C. 154(b) by 602 days.

This patent is subject to a terminal disclaimer.

(21) Appl. No.: 13/602,453

(22) Filed: Sep. 4, 2012

Related U.S. Application Data

(63) Continuation of application No. 12/561,561, filed on Sep. 17, 2009, now Pat. No. 8,264,524.

(60) Provisional application No. 61/097,661, filed on Sep. 17, 2008.

(51) Int. Cl.
| | | |
|---|---|---|
| H04N 7/12 | (2006.01) | |
| H04N 19/17 | (2014.01) | |
| H04N 7/18 | (2006.01) | |
| H04N 5/232 | (2006.01) | |

(52) U.S. Cl.
CPC ........... *H04N 5/23238* (2013.01); *H04N 7/18* (2013.01)

(58) Field of Classification Search
CPC ........... H04N 5/23206; H04N 5/23238; H04N 21/2187; H04N 21/2343; H04N 19/48; H04N 21/6581; H04N 19/164; H04N 19/17; H04N 21/4728; H04N 19/60; H04N 5/225
USPC .............. 375/240.01, 240.13; 348/36, 208.2, 348/222.1, 335, 169
See application file for complete search history.

(56) References Cited

U.S. PATENT DOCUMENTS

| | | | | |
|---|---|---|---|---|
| 6,020,931 | A * | 2/2000 | Bilbrey ................. | H04N 5/222 348/584 |
| 8,264,524 | B1 * | 9/2012 | Davey ............................ | 348/36 |
| 2003/0161302 | A1 * | 8/2003 | Zimmermann ..... | H04L 12/5693 370/363 |
| 2005/0046702 | A1 * | 3/2005 | Katayama ............. | G06T 15/205 348/222.1 |
| 2006/0062478 | A1 * | 3/2006 | Cetin ............... | G08B 13/19652 382/232 |
| 2007/0279494 | A1 * | 12/2007 | Aman ................... | G01S 3/7864 348/169 |
| 2007/0297509 | A1 * | 12/2007 | Mizobuchi ......... | H04N 5/44508 375/240.12 |
| 2008/0062168 | A1 * | 3/2008 | Poullier ............. | H04N 1/00132 345/419 |
| 2008/0129825 | A1 * | 6/2008 | DeAngelis ......... | A63B 24/0021 348/169 |
| 2008/0136923 | A1 * | 6/2008 | Inbar .................... | G02B 27/646 348/208.2 |

(Continued)

OTHER PUBLICATIONS

Panoram Technologies, Inc. "Sources—Fullview 360 Camera Product Specifications." Panoram Technologies, Inc. Dec. 3, 2002. Retrieved Sep. 6, 2016, from https://web.archive.org/web/20021203075353/http://www.panoramtech.com/products/fullview_specs.html.

*Primary Examiner* — Reza Aghevli
(74) *Attorney, Agent, or Firm* — Gwendolyn G. Corcoran; Robert O. Groover, III; Groover & Associates PLLC

(57) ABSTRACT

A wide-angle camera emulating a PTZ camera via image data processing is used to generate a panoramic image of multiple regions for ease of viewing. A client can specify multiple regions for extraction from the panoramic image to stream to a separate server for further image processing and analysis.

7 Claims, 5 Drawing Sheets

(56) References Cited

U.S. PATENT DOCUMENTS

2008/0267290 A1\* 10/2008 Barbieri ............... H04N 19/593
　　　　　　　　　　　　　　　　　　　　　375/240.13
2009/0040293 A1\* 2/2009 Foo ........................ G03B 37/04
　　　　　　　　　　　　　　　　　　　　　348/36

\* cited by examiner

SYSTEM FOR STREAMING MULTIPLE REGIONS DERIVING FROM A WIDE-ANGLE CAMERA

CROSS REFERENCE TO RELATED APPLICATIONS

This application is a continuation of U.S. application Ser. No. 12/561,561, now issued as U.S. Pat. No. 8,264,524. Priority is claimed therethrough from provisional patent application 61/097,661, filed on Sep. 17, 2008, which is hereby incorporated by reference.

BACKGROUND

The present inventions relate generally to image processing in a wide-angle video camera, and more specifically to processing image data for transformation into a panoramic view image data stream.

Note that the points discussed below may reflect the hindsight gained from the disclosed inventions, and are not necessarily admitted to be prior art.

Video surveillance systems using wide-angle optical systems apply image data processing to enhance or obscure visual information as necessary using program algorithms. It is useful to be able to define the extents within which image processing operations should take place; for example moving region detection and object tracking software may define the bounding box of a suspicious object and use it to direct enhancement processing to the appropriate area of the image. Regions of interest (ROIs) can be identified in the image based on motion, color, behavior, or object identification. Computer algorithms and programs can be implemented at the camera or at a monitoring base station to automate selection of the ROIs, motion tracking, sound an alarm, summon emergency responders, activate responsive systems (e.g., close doors, seal bulkhead, lock doors, activate ventilation or fire-suppression system, activate lighting, etc.), or other actions as programmed into the system. Further, the object tracking, or alarm, or other processing can be performed on the corrected or on uncorrected versions of the images or video.

In many surveillance systems, standard pan-tilt-zoom (PTZ) cameras capture images of an area. A PTZ camera relies on mechanical gears to adjust the pan, tilt, and zoom of the camera. These cameras have various disadvantages or limitations in surveillance system and applications. Typically, adjusting to concentrate on a region of interest (ROI) necessarily requires a PTZ camera to adjust its view to the ROI and lose sight of the overall area. PTZ cameras are also prone to mechanical failure, misalignment during maintenance, and are relatively heavy and expensive.

In more recent surveillance systems, a new class of cameras replaces the mechanical PTZ mechanisms with a wide-angle optical system and image processing circuitry and software. This type of camera monitors a wide-angle field of view and selects ROIs from the view to transmit to a base station; in this way it emulates the behavior of a mechanical PTZ camera. The wide-angle view can be as much as 180° and capture a full hemisphere of visual data. The wide-angle optics (such as a fisheye lens) introduces distortion into the captured image and processing algorithms are used to correct the distortion and convert it to a view that has a similar view and function as a mechanical PTZ camera. The movements and zoom function are emulated by image data processing accomplished by internal circuitry.

However, these innovations can be used in a camera with a view angle considerably less than 180°. The inventions can be used with annular lenses that often provide imagery that is not from 0 to 90 degree in the tilt (phi in spherical coordinates), but perhaps 40 to 130 degrees. Another lens type can use an ovalized rectangle shape. References to wide-angle cameras include lens systems that meet these criteria.

The captured 3D world space hemispherical image from a wide-angle camera appears distorted, and it can comprise what is sometimes referred to as a fisheye view. Image processing algorithms can correct this view to a more conventional 2D depiction on a monitor and also emulate the movement of a PTZ camera. The wide-view camera can simultaneously focus on multiple ROIs while still able to monitor the area within its entire field of view. This type of camera may be used to improve the processing of selected ROIs, because a wide field is always captured by the camera, and there is no need for mechanical movement and adjustment of the camera's lens system.

The image processing is typically performed on digital image data. The captured image data is converted into a digital format for image data processing at the camera. The processed data can than be transmitted to a base station for viewing. The image data can be converted to an analog signal for transmission to the base station, or the image data can be left in the processed digital format. Additionally, the input signal to the base station, either analog or digital, can be further processed by the base station. Again, image processing and ROI selection at the camera can be fully automatic or subject to various control inputs or overrides that effect automatic image processing. Manual, automatic, or a combination of control options utilizing the combination of the base station and internal camera circuitry can be implemented.

SUMMARY

The present application discloses new approaches to viewing image data from a wide-angle camera by transforming the wide-angle view into a panoramic display to extract multiple ROIs.

In some embodiments, the inventions disclose methods and systems that convert a captured wide-angle image into a panoramic set of images. Multiple ROIs can be extracted from the overall transformed panoramic image with the ROIs displayed for further processing (e.g., magnification, PTZ, etc). The panoramic images are easier to interpret compared to a wide-angle view, and extracted ROIs can be efficiently streamed together with the panoramic image.

The disclosed innovations, in various embodiments, provide one or more of at least the following advantages. However, not all of these advantages result from every one of the innovations disclosed, and this list of advantages does not limit the various claimed inventions.

Ease of viewing and selecting multiple ROIs.
Ability to display adjacent ROIs as a coherent and continuous panoramic display image.
Easier viewing of ROIs by converting to a common orientation (i.e., all displayed right side up from a view where ROIs are inverted relative to each other).
Lighter, dispensing with mechanical PZT components.
Cheaper.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

The numerous innovative teachings of the present application will be described with particular reference to the presently preferred embodiment (by way of example, and not of limitation).

Figure 1:
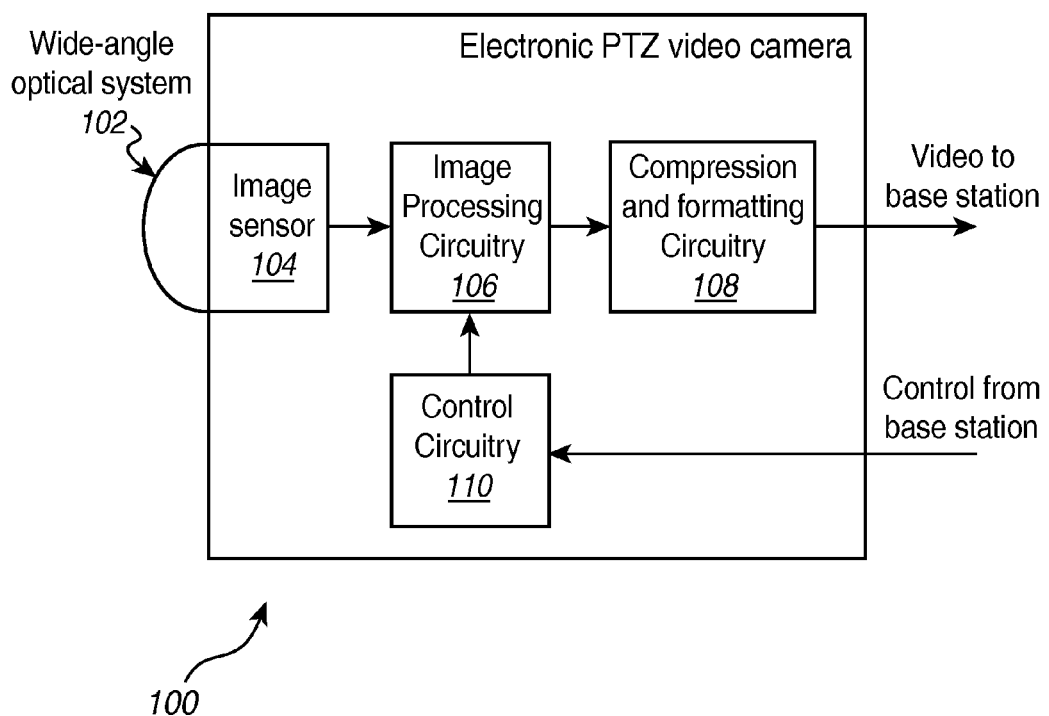
FIG. 1 schematically shows an example of an electronic PTZ wide-angle video camera.

FIG. 1 shows one example implementation of a preferred embodiment of an electronic PTZ camera, this example being described in terms of a video camera 100. The camera 100 includes an optical system 102 that communicates with image sensor 104. In some embodiments, the optical system 102 is a wide angle, anamorphic, annular, or panoramic lens system (for example), possibly including multiple lenses, holographic elements, or other elements. The lens is typically configured to cover an approximate 180° field. Sensor 104 passes a captured image to image processing circuitry 106 for processing, such as correction of any distortions of the image caused by the optical system 102 (though other processing is also possible). Examples of image processing that might be performed include geometric transformations (zoom-in, zoom-out, rotate, etc.), color correction, brightness and contrast adjustment, shading, compositing, interpolation, demosaicing, image editing, or segmenting. PTZ emulating image processing occurs in the image processing circuitry 106. Other processes performed on the image data are possible. In some embodiments, the optical system distortion is corrected though the use of tables of correction values that define the necessary warping, such as that caused by the lens system or other known factors.

The corrected image is preferably compressed and formatted by circuitry 108 before being output, such as to a base station (not shown) for monitoring. The camera 100 is preferably controlled by the base station through control circuitry 110. It is noted that other architectures and camera arrangements can implement the present innovations, and the example of FIG. 1 is only illustrative and not limiting.

The control circuitry 110 is used to control aspects of operation of the image processing circuitry 106. Various control options can be implemented for circuitry 110 and 106. Operation can be configured for automatic control selecting ROIs based on operating algorithms such as face recognition, motion detecting, event detection, or other implemented parameters. PTZ control can operate to focus on one or more ROI simultaneously while maintaining surveillance throughout the field of view. Control from a base station can be automatic or manual, with the ability to manually select ROIs, adjust image quality parameters, or otherwise adjust and manipulate the image or PTZ view. Control can essentially be automatic within the camera with manual adjustments or overrides performed by the base station. This flexibility to control and vary the captured views by data processing can be thought of as implementing one or more virtual cameras, each able to be independently controlled, by processing captured image data from the single optical system, or even a combination of several optical systems, and emulate one or more PTZ cameras.

Various optical distortion effects can be introduced by the optical system 102, i.e. lens configuration, that the image processing circuitry 106 can compensate. For example, in geometric optics and cathode ray tube (CRT) displays, distortion is a deviation from rectilinear projection, that is, a projection in which straight lines in a scene fail to remain straight in an image. This is a form of optical aberration. Although distortion can be irregular or follow many patterns, the most commonly encountered distortions are radially symmetric, or approximately so, arising from the symmetry of a photographic lens.

Radial distortion can usually be classified as one of two main types: 1) barrel distortion and 2) pincushion distortion. In "barrel distortion", image magnification decreases with distance from the optical axis. The apparent effect is that of an image which has been mapped around a sphere. Fisheye and similar lenses, which take hemispherical views, utilize this type of distortion as a way to map an infinitely wide object plane into a finite image area. In "pincushion distortion", image magnification increases with the distance from the optical axis. The visible effect is that lines that do not go through the centre of the image are bowed inwards, towards the centre of the image.

Radial distortion is a failure of a lens to be rectilinear: a failure to image lines into lines. If a photograph is not taken straight-on then, even with a perfect rectilinear lens, rectangles will appear as trapezoids: lines are imaged as lines, but the angles between them are not preserved (tilt is not a conformal map). This effect can be controlled by using a perspective control lens, or corrected in post-processing, such as image data processing.

Due to perspective, cameras image a cube as a square frustum (a truncated pyramid, with trapezoidal sides)—the far end is smaller than the near end. This creates perspective, and the rate at which this scaling happens (how quickly more distant objects shrink) creates a sense of a scene being deep or shallow. This cannot be changed or corrected by a simple transform of the resulting image, because it requires 3D information, namely the depth of objects in the scene. This effect is known as perspective distortion. This radial distortion can be corrected by algorithms operating in the camera.

The described embodiments include the capability to select a region of a captured image (such as one or more frames of video), whether processed or not, and to perform other data processing on that region. In one example implementation, the innovative camera captures an image, such as wide angle video (but not limited thereto), and corrects the wide angle view to create a corrected view (i.e., not distorted or less distorted view) that is sent to an operator. The operator (or specially designed software) can then define or designate a ROI for observation. In other embodiments, some processing is performed at different steps, such as object tracking, behavior analysis, motion detection, object recognition, or face recognition (for examples).

Streaming Multiple Regions Derived from a Wide-Angle Camera

Figure 2:
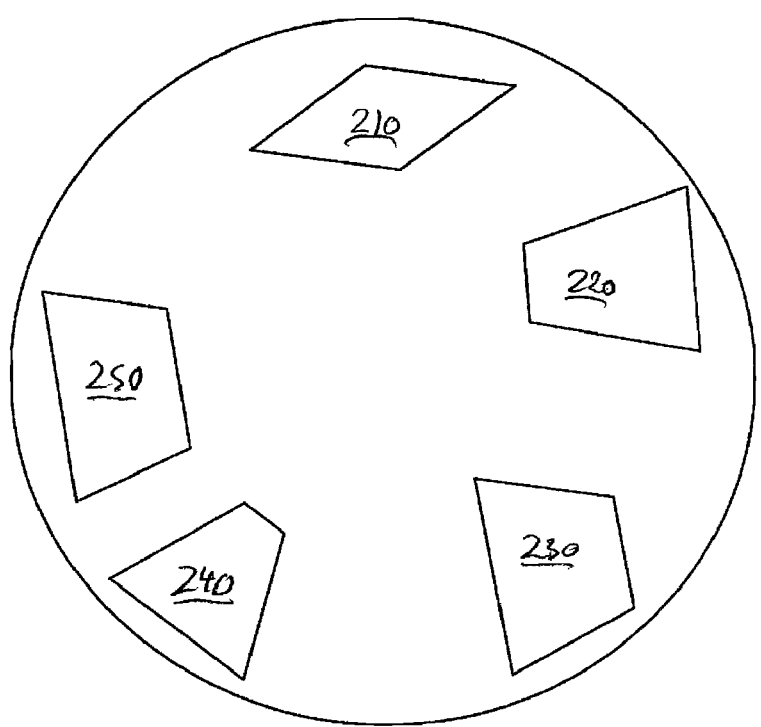
FIG. 2 shows an example of a wide-angle distorted image view with multiple ROIs.

FIG. 2 shows an example of a wide-angle distorted image view with multiple ROIs. The wide-angle view 200 has five ROIs (210, 220, 230, 240, and 250) in the captured image. This distorted view can include ROIs 210 and 240, which relative to each other are views with 180° relative rotation (i.e., apparently inverted) imparted by the optical distortion.

Figure 3:
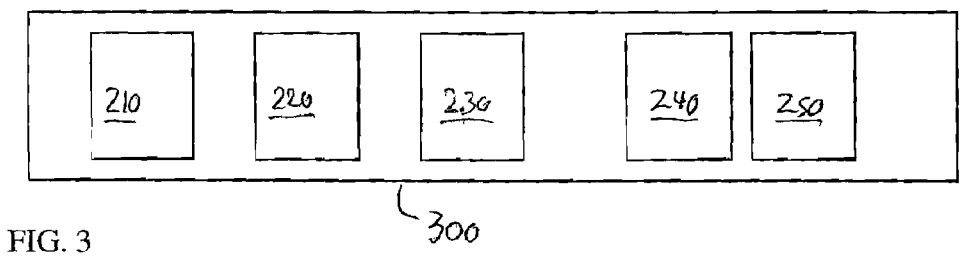
FIG. 3 shows an example of a wide-angle image with distorted image views and ROIs transformed into a panoramic view.

The image processing algorithms functioning on the camera's internal image processor circuitry (or external at a base station) can transform the image into one or more panoramic images inside the camera as shown in FIG. 3.

FIG. 3 shows an example of a wide-angle image with distorted image views and ROIs transformed into a panoramic view 300. The five ROIs are now shown as adjacent images with corrected relative orientation, so the ROI images are not relatively inverted. The internal circuitry compresses the panoramic image using Joint Photographic Experts Group (JPEG) compression (or some other image data compression such as Moving Picture Experts Group (MPEG) 1/2/4 or H.261/3/4). JPEG specifies both the codec, defining how the image is compressed into a stream of bytes and decompressed back into an image, and the file format used for that stream.

A JPEG file can be encoded in various ways, and an exemplary process follows consisting of several steps:
1. The representation of the colors in the image is converted from RGB to YCbCr, consisting of one luma, brightness, component (Y) and two chroma, color, components (Cb and Cr).
2. The resolution of the chroma data is reduced, usually by a factor of 2.
3. The image is split into blocks of 8×8 pixels, and for each block, each Y, Cb, and Cr data value undergoes a discrete cosine transform (DCT) to produce a spatial frequency spectrum.
4. The amplitudes of the frequency components are quantized. Because human vision is more sensitive to small variations in color or brightness over large areas than to the strength of high-frequency brightness variations, the magnitudes of the high-frequency components are stored with a lower accuracy than the low-frequency components. The quality setting of the encoder (e.g., 50 or 95 on a scale of 0-100) affects the extent the resolution for each component is reduced.
5. The resulting data for all 8×8 blocks is further compressed with a variant of a Huffman encoding loss-less algorithm.

The decoding process will reverse these steps. The extraction of a JPEG image can be considered a transcoding operation. After compression, the compressed panoramic images are streamed to a separate server by transmitting circuitry in the camera. However, once the image data is compressed, the original image data is destroyed, because compressing and decompressing introduces artifacts, but lossless compression does not achieve a good compression ratio (e.g. 3:1 versus 15:1 for JPEG).

Figure 4:
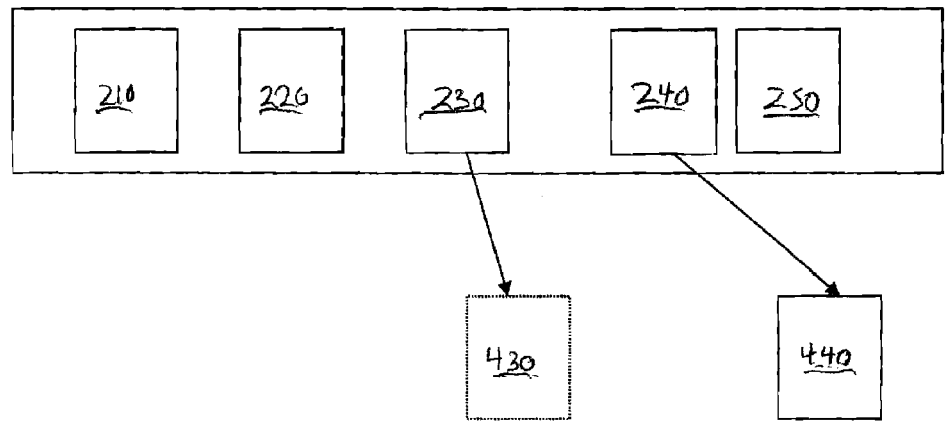
FIG. 4 shows the panoramic view with ROIs extracted.

After receiving the streamed images, the server can receive a request from a client for a ROI within the panorama. FIG. 4 shows the panoramic view with ROIs extracted. The panoramic view 400 includes the ROIs 210-250 previously noted. For a JPEG compression, the server processes the image data to extract data from the Huffman bit stream resulting in a set of DCT blocks (e.g., an 8×8 pixel data set) describing the entire panoramic image. It is not necessary to perform inverse DCT calculations or any other aspect of JPEG decompression. From the set of DCT blocks, the blocks that contain the requested ROI are extracted, and the extracted DCT blocks collected together, Huffman encoded, and a JPEG header attached. This JPEG image can then be streamed.

Figure 5:
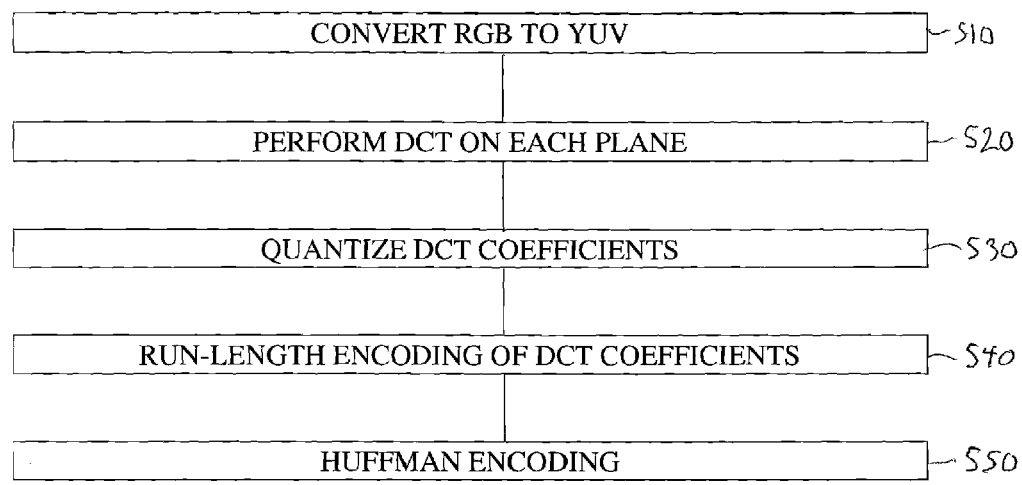
FIG. 5 shows an exemplary process flow for JPEG encoding.

FIG. 5 shows an embodiment of a JPEG encoding pipeline compatible with the inventions. In step 510, the image is converted from RGB color values to YUV luma and chrominance values (YCbCr), with a chrominance downscale, e.g., YUV 420, halving the chrominance data resolution. A planar format is preferred with the Y, U, and V values grouped together instead of interspersed. In step 520, the encoding performs a discrete cosine transform (DCT) on each plane, which is sectioned into blocks of pixels, e.g., 8×8. At step 530, the encoding quantizes the DCT coefficients in each block, resulting in DC plus AC coefficients. Some high frequency components become zero, and the DC coefficient is differential. In normal JPEG encoding, each JPEG file has an absolute value specified for the first block. To avoid any problem, a marker can be added to specify the value of the DC coefficient at each marker location, e.g., at the start of each row. At step 540, a run-length encoding of the DCT coefficients is performed to compress the data where runs of data with the same value are stored as a single data value and count. Finally, in step 550, the DCT blocks undergo Huffman encoding for transmission.

For other compression algorithms, instead of DCT, some other extraction method may be used. One such example is a block-based wavelet. After encoding, the wavelets can be extracted and then collected to form the new image.

FIG. 4 shows that multiple ROIs, 430 and 440, can be extracted and streamed from a single panoramic image requiring only a single extraction from the Huffman bit stream. The server can store the panoramic images and stream regions (e.g., ROIs) from them for viewing at a later date. Data processing for object recognition, motion detection, event detection, or other implemented parameters can be performed on the overall image and the extracted ROIs, with the ROIs selected automatically or manually by the client. Resizing of the streamed region, or other PTZ emulations, can be handled at the client before or after JPEG decompression. An exemplary client can provide PTZ commands which are converted into a region position and size that are then sent to the server and the relevant ROI extracted. However, this PTZ processing can be performed before or after the panorama extraction.

To conserve bandwidth, the server performs image downsizing while the client performs any upsizing. Although the PTZ resizing can be done on the client after decompression, some aspects of resizing can be performed on the server in the DCT domain. Images can be resized per a zoom command in the DCT domain. In this way, if the client requests a particular PTZ and an output size, and if the region on the panorama is substantially bigger than the output size, the server may be utilized to reduce the size of the image in the DCT domain and send this smaller image to the client. This reduces the network bandwidth by transmitting the smaller size image, i.e., less image data. It may be possible that the resulting smaller amount of Huffman encoding of the reduced size image can make up for the time spent doing the reduction. The server can communicate the fact that downsizing has taken place in the image header for example.

Figure 6:
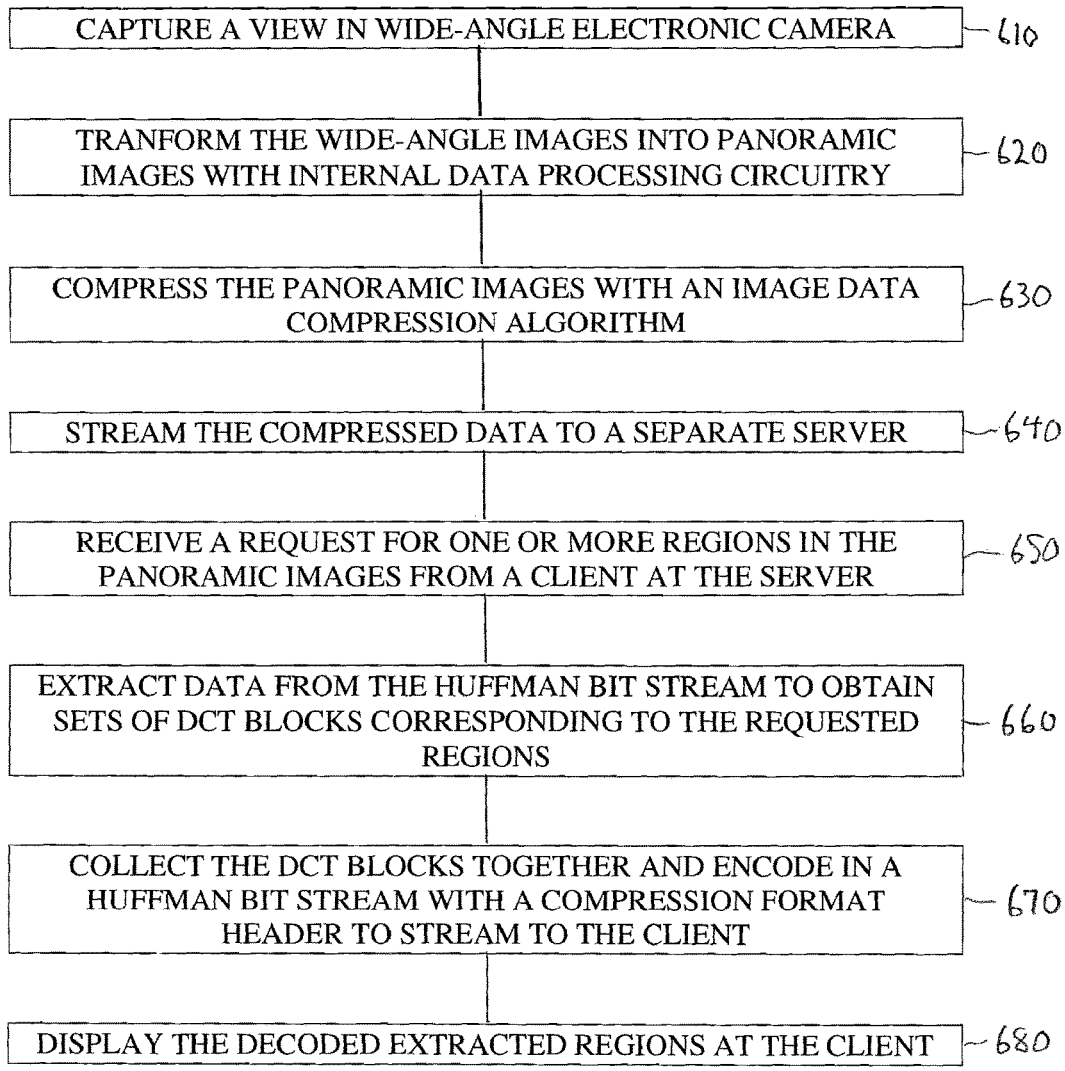
FIG. 6 shows an exemplary process flow of the inventions.

FIG. 6 shows an exemplary process flow of the inventions. At step 610, the system captures a view in a wide-angle PTZ electronic camera and transforms the wide-angle images into panoramic images with internal data processing circuitry in step 620. In step 630, the camera compresses the panoramic images with an image data compression algorithm (e.g., JPEG). Then, the camera streams the compressed data to a separate server in step 640, typically in a Huffman bit stream format.

In step 650, the server receives a request for one or more regions in the panoramic images from a client. The server then extracts data from the Huffman bit stream to obtain sets of DCT blocks corresponding to the requested regions in step 660. In step 670, the server collects and collates the DCT blocks together and encodes the blocks into a Huffman bit stream with a compression format header to stream to the client. The client then displays the decoded extracted regions in step 680.

It should be clear to those skilled in the art that the techniques disclosed above might be applied to more than one region within a camera. The foregoing has described methods for the implementation of image processing within regions that are given for illustration and not for limitation. Thus the invention is to be limited only by the appended claims.

According to a disclosed class of innovative embodiments, there is provided: A system for streaming multiple regions derived from a wide-angle digital camera, comprising: a wide-angle camera capturing images not optimally scaled for human perception; an image data processing circuit that transforms the images for better human perception, transforms the images into quasi-panoramic images, in which vertical lines of the image stay vertical, images, and compresses the image using a visual data compression; a circuit transmitting the compressed panoramic images to a server, said server able to respond to a request from a client by extracting at least one requested region in the panoramic images; and the server extracting the requested region and collecting the regions to stream to the client.

According to a disclosed class of innovative embodiments, there is provided: A system for extracting regions of interest derived from a wide-angle digital camera, comprising: an image data processing circuit that transforms non-rectilinear digital images into panoramic images, and compresses the image data using an image data compression algorithm with block-encoding of at least parts of said images; and a server associated with the camera receiving streamed compressed panoramic images and responding to a request from a client by extracting at least one requested region of interest from the panoramic images; wherein the server extracts the regions from a transmission encoded data stream as a set of discrete encoded blocks to re-encode for transmission.

According to a disclosed class of innovative embodiments, there is provided: A system for viewing extracted regions from a parametric view, comprising: a digital camera with internal image processing circuitry that transforms wide-angle images into panoramic image data, and compresses the image data using a JPEG compression for streaming to a coupled server; and said server responding to a request from a client by extracting at least one requested region of interest from the panoramic image data; wherein the server extracts each region of interest as a set of discrete cosine transform blocks that it collects and collates for streaming to the client.

According to a disclosed class of innovative embodiments, there is provided: According to a disclosed class of innovative embodiments, there is provided: A method for extracting a region of interest from a wide-angle image, comprising the steps of: transforming non-rectilinear image data into one or more substantially less non-rectilinear images; compressing the images using an image data compression algorithm that includes a two-dimensional block sectioning for transmission encoding into a bit stream; and processing a request for at least one region of interest in the substantially less non-rectilinear images so as to extract data blocks from the encoded bit stream to obtain sets of data blocks corresponding to the requested regions.

According to a disclosed class of innovative embodiments, there is provided: A method for viewing a region of interest on a wide-angle image, comprising the steps of: transmitting from a client at least one request to view one or more regions of interest at a server, said server in response extracting data from a bit stream to obtain a set of DCT blocks of the at least one requested region, which are then collected and transmission-encoded for streaming to said client; decoding at the client the encoded DCT blocks; and displaying the decoded extracted regions.

According to a disclosed class of innovative embodiments, there is provided: A method for generating a region of interest in a digital video stream, comprising the steps of: processing rectilinear-deviated image data on an internal data processing circuit of a digital PTZ camera to transform into substantially rectilinear image data; compressing the substantially rectilinear image data using a data compression algorithm to encode the image data into two-dimensionally transformed subimage data blocks; transmission-encoding the data blocks for streaming to a server; and responding to a view request at the server by reversing the transmission-encoding to extract sets of block-encoded data portions to thereby generate one or more block-encoded subimages.

According to a disclosed class of innovative embodiments, there is provided: A method for managing non-rectilinear images, comprising the actions of: transforming a non-rectilinear image into a derived image which is more nearly rectilinear, and which corresponds to an approximately cylindrical panoramic view; block encoding said derived view, using at least a two-dimensional transformation; and transmission-encoding said derived view; and, when a view request is received, reversing said transmission-encoding step but not said block-encoding step, to thereby produce a block-encoded subimage; and re-encoding and retransmitting said block-encoded subimage; whereby a user can decode and view said block-encoded subimage.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

The references herein to video is not limited to analog or video alone, and can be either variety or any other format or type of imaging technology, and can include still images.

The innovations of the present application are preferably implemented using a wide-angle camera, though any type of camera can be used in implementing the present invention, including other anamorphic and non-anamorphic imaging systems. Additionally, although a video camera is described a camera capturing still images at a periodic time interval can be used.

It is obvious that in some embodiments the server can receive the overall wide-angle view and process the image data as described to output a panoramic view for image extraction and streaming to a client.

In another possible variation, the camera transforms the warped image into a panorama (e.g., Mercator or Lambert view or the like). Then, downstream from the camera, multiple windows are extracted from the panorama view, and the view extraction is from one or more of the windows.

Although a PTZ electronic camera is described, the camera system can also include a rotation movement, i.e. a PTZR electronic camera.

It also readily apparent that only partial decompression is required. The innovations only require an anti-Huffman decompression and not an anti-DCT. The system must extract the relevant DCT blocks (with starting DC offset and re-Huffmanize the blocks). However, the blocks in the DCT domain do not have an absolute DC value, but an offset from a previous base block. One possibility to compensate is to place regular "markers" in the JPEG stream that effectively mark the next "base block" to make the calculation of the DC coefficients in the reconstructed JPEG easier to compute.

Additionally, although a DCT block encoding is preferred, alternatively another two-dimensional block encoding routine can be used to create blocks of pixel data for extraction.

A panorama that is useful with respect to these innovations will not be able to image the entire wide-angle view if that view approaches 180 degrees. Consider a ceiling mount camera. The panoramic image of the floor area directly below the camera will be severely distorted and is therefore not useful. A wall mounted panorama will typically not image the top and bottom of the scene, but focus on the central area. Thus, the algorithms used for generating these ceiling and wall mount panoramas are very different. It will necessarily require different algorithms for generating panoramas in different mounts.

The innovations can also be implemented using multiple cameras in various configurations. Two or more cameras can be positioned with overlapping fields-of-view to capture overlapping views. The client can request ROIs from the cameras, providing multiple views of the same regions.

The various innovations can be implemented via one or more internal camera image processors or on a separately connected base station.

As has been mentioned above, the examples given herein are only illustrative and are not intended to imply that these are the only ways to implement the present innovations. The order of the actions described herein, and the locations at which they are performed, can of course vary within the scope of the present innovations. These innovations are also applicable for other types of processing aside from those mentioned, beyond object tracking, privacy domains, and alarm triggering. Outside computer systems, such as servers, can be used for calculating many of the necessary functions, or the camera itself can be equipped with this capability.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A system for streaming multiple regions derived from a wide-angle digital camera, comprising:
    a wide-angle camera capturing images not optimally scaled for human perception;
    an image data processing circuit that transforms the images from the wide-angle camera into quasi-panoramic images which are optimally scaled for human perception, in which vertical lines of the image stay vertical, and compresses the image using a visual data compression;
    a circuit transmitting the compressed quasi-panoramic images to a server;
    said server responding to a request for a region from a client by extracting at least one requested region in the quasi-panoramic images; and
    said server collecting the extracted regions to stream to the client;
    wherein the compressed quasi-panoramic images are compressed using an image compression algorithm and block encoding.

2. The system of claim 1, wherein the images are compressed using an image compression encoding that includes a conversion to a planar format of Y, U, V values grouped together.

3. The system of claim 1, further comprising:
    a processing circuit that performs a discrete cosine transform on a planar set of grouped YUV values to generate sectioned blocks of pixels.

4. The system of claim 3, further comprising:
    a processing circuit that quantizes the discrete cosine transform coefficients in each block to produce DC and AC coefficients, with a defined marker value inserted at specific periodic image locations; and
    a run-length encoding of the discrete cosine transform coefficients, wherein the blocks undergo a Huffman encoding and streaming.

5. The system of claim 4, further comprising:
    the server extracting from the Huffman stream encoded blocks a set of blocks corresponding to the at least one requested region;
    wherein the extracted blocks are collected and collated as an image data set for Huffman encoding and streaming.

6. The system of claim 1, wherein the client performs any requested upsizing of the region.

7. The system of claim 1, wherein the sever performs any requested downsizing of the region.

* * * * *